(12) United States Patent
Morellec et al.

(10) Patent No.: US 6,973,251 B2
(45) Date of Patent: Dec. 6, 2005

(54) LARGE CAPACITY AUTOMATIC DISTRIBUTOR, PARTICULARLY FOR OPTIC FIBERS; DEVICE AND METHOD FOR AUTOMATIC CONNECTION AND DISCONNECTION OF JUMPER FIBERS WITHIN THE DISTRIBUTOR

(75) Inventors: Daniel Morellec, Lannion (FR); Gilles Le Traon, Lannion (FR); Yoann Bouchet, Erbray (FR)

(73) Assignee: Fahrenheit Thermoscope LLC, Las Vegas, NV (US)

( * ) Notice: Subject to any disclaimer, the term of this patent is extended or adjusted under 35 U.S.C. 154(b) by 0 days.

(21) Appl. No.: 10/725,978

(22) Filed: Dec. 1, 2003

(65) Prior Publication Data

US 2004/0136677 A1    Jul. 15, 2004

Related U.S. Application Data

(63) Continuation of application No. PCT/FR02/01750, filed on May 24, 2002.

(30) Foreign Application Priority Data

May 29, 2001  (FR)  .................................. 01 07032

(51) Int. Cl.[7] .............................. G02B 6/46; G02B 6/54
(52) U.S. Cl. ..................................................... 385/135
(58) Field of Search ................................. 385/134–139

(56) References Cited

U.S. PATENT DOCUMENTS

| | | | |
|---|---|---|---|
| 5,129,030 A | | 7/1992 | Petrunia |
| 5,394,503 A | * | 2/1995 | Dietz et al. ................... 385/135 |
| 5,701,380 A | * | 12/1997 | Larson et al. ................ 385/134 |
| 6,044,193 A | * | 3/2000 | Szentesi et al. .............. 385/134 |
| 6,157,766 A | * | 12/2000 | Laniepce et al. ............ 385/134 |
| 6,721,482 B1 | * | 4/2004 | Glynn ......................... 385/135 |
| 6,760,531 B1 | * | 7/2004 | Solheid et al. ............... 385/135 |
| 2002/0118943 A1 | * | 8/2002 | Solheid et al. ............... 385/134 |
| 2004/0146266 A1 | * | 7/2004 | Solheid et al. ............... 385/135 |

FOREIGN PATENT DOCUMENTS

| | | | | |
|---|---|---|---|---|
| JP | 09 159840 A | | 6/1997 | |
| JP | 09159840 A | * | 6/1997 | ............. G02B 6/00 |
| JP | 09159841 A | * | 6/1997 | ............. G02B 6/00 |

* cited by examiner

*Primary Examiner*—Michelle R. Connelly-Cushwa
(74) *Attorney, Agent, or Firm*—Meyertons Hood Kivlin Kowert & Goetzel, P.C.; B. Noël Kivlin

(57) ABSTRACT

An optical fiber distribution frame including a first cross-connection panel and a second cross-connection panel facing each other, and a first support in each panel for connection modules. Each module on the first panel is adapted to be connected to one end of an optical fiber of a first group, each module on the second panel is adapted to be connected to one end of an optical fiber of a second group, and an optical fiber of the first group is adapted to be connected to an optical fiber of the second group by a jumper fiber which has two ends respectively received in a port of one of the modules on the first panel and in a port of one of the modules on the second panel. The first and second panels each include a second connection module support, with said second supports cooperating with each other to form a storage area for jumper fibers that are not in use and awaiting connection. The jumper fibers are automatically connected or disconnected by a device.

33 Claims, 6 Drawing Sheets

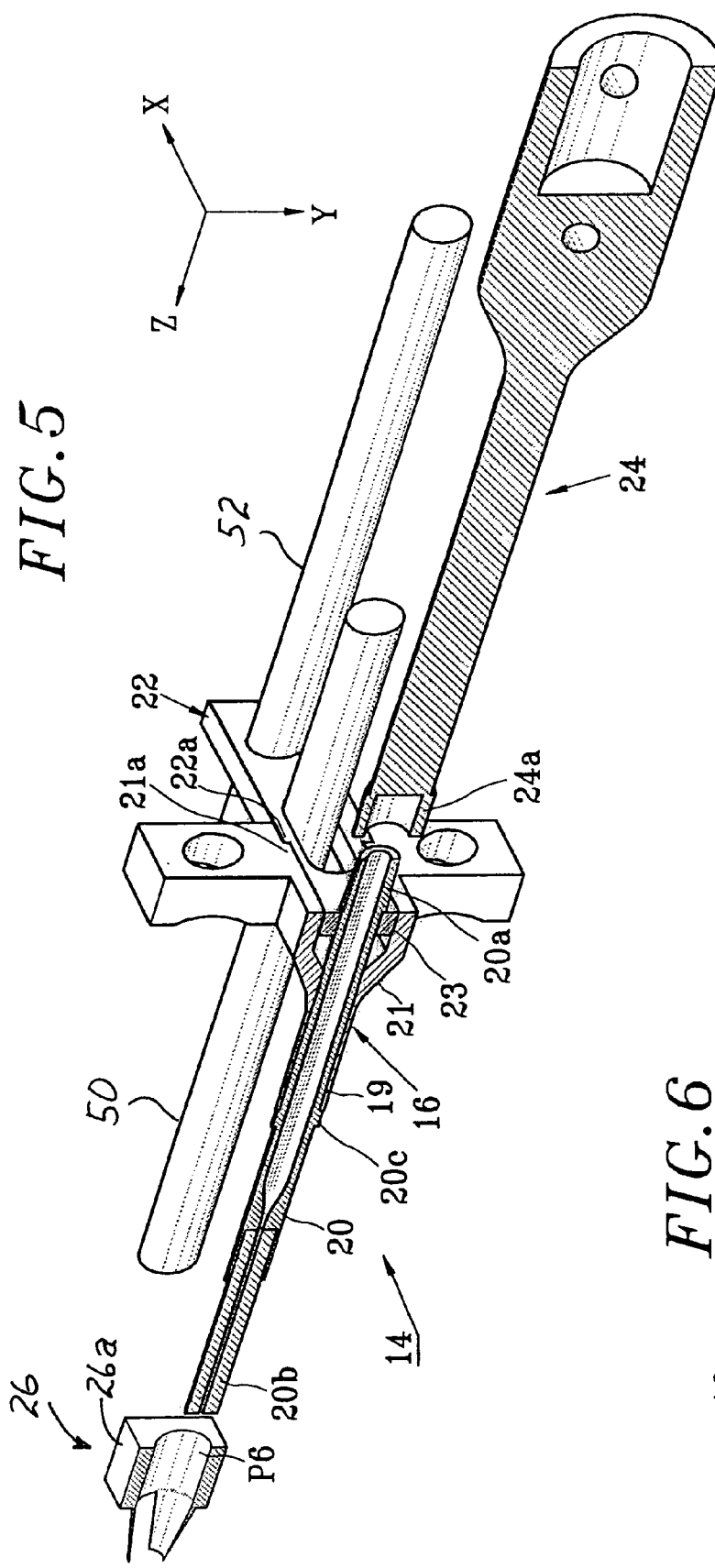
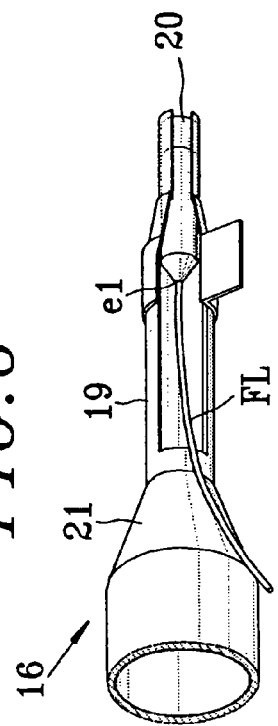

LARGE CAPACITY AUTOMATIC DISTRIBUTOR, PARTICULARLY FOR OPTIC FIBERS; DEVICE AND METHOD FOR AUTOMATIC CONNECTION AND DISCONNECTION OF JUMPER FIBERS WITHIN THE DISTRIBUTOR

This application is a U.S. Continuation Application under 35 USC 371 of International Application PCT/FR02/01750 filed 24 May 2002.

FIELD OF THE INVENTION

The present invention relates to a high-capacity, high-density optical fiber distribution frame, and in particular, for automatically connecting and disconnecting jumper fibers cross-connected in the distribution frame.

BACKGROUND OF THE INVENTION

An optical fiber distribution frame is described in the document EP 0 886 158 which includes a first cross-connection panel and a second cross-connection panel facing each other. A first support is provided for connection modules belonging to each panel, each module on the first panel being adapted to be connected to one end of an optical fiber of a first group, each module on the second panel being adapted to be connected to one end of an optical fiber of a second group. An optical fiber of the first group is adapted to be connected to an optical fiber of the second group by a jumper fiber which has two ends respectively received in a port of one of the modules on the first panel and in a port of one of the modules on the second panel. During a cross-connection operation, the connection module support on which the jumper fiber to be cross-connected is located is positioned vertically so that, using an appropriate tool, an operative can insert said fiber into the mass of jumper fiber ends that are connected to the cross-connection panel containing said support or extract it therefrom. Because of the rotation of the connection module supports, the distribution frame described in the document EP 0 886 158 provides very easy access to the jumper fibers to be manipulated.

Although the density of the above distribution frame is advantageous, it also makes it difficult to insert a tool manually into the row of fibers connected to a support raised to the vertical position. There is a permanent risk of disturbance to adjacent fibers in the event of misoperations by the operative while working on the frame.

The drawback of the above distribution frame is eliminated in the frame disclosed in the document U.S. Pat. No. 5,784,515, which describes an optical fiber distribution frame in which the jumper fibers are cross-connected automatically. The distribution frame includes a horizontal cross-connection panel which includes a first series of holes into which adapters (connectors) for optically aligning the fibers are fixed. A first robot arm under the cross-connection panel connects or disconnects the fibers. The cross-connection panel further includes a second series of holes through which the surplus lengths of fiber pass. A second robot arm above the cross-connection panel handles the management of these surplus lengths in order to free space for the first robot arm to move around in it.

Although the above distribution frame has the advantage of being automatic, the use of two robot arms considerably complicates management of the fibers to be cross-connected. Furthermore, because the distribution frame must be equipped for its maximum potential capacity when it is first commissioned, this necessarily generates an installation overinvestment that is incompatible with progressive introduction of optical fibers into telecommunications networks.

The documents U.S. Pat. No. 5 436 987 and JP-A-07-333530 both describe high-capacity automated distribution frames which cross-connect jumper fibers at a single connection point. A robot connects or disconnects any fiber from an end selected from among a mass of fibers. An automatic winding system manages the surplus lengths of fiber. In U.S. Pat. No. 5 436 987, two rollers feed the fibers that are not in use to a stowage area. In JP-A-07-333530, an arm fitted with a hook picks up a jumper fiber that is not in use in order to stow it.

Although the distribution frames described in the above two documents can provide high capacities, management of the surplus lengths of fiber nevertheless remains difficult, the winding system being relatively complex.

SUMMARY OF THE INVENTION

One object of the present invention is to automate at low cost the cross-connection functions for jumper fibers in a distribution frame.

This and other objects are attained in accordance with one aspect of the present invention is directed to an optical fiber distribution frame including a first cross-connection panel and a second cross-connection panel facing each other, and a first set of connection modules belonging to said first connection panel, and a second set of cross-connection modules belonging to said second cross-connection panel. Each module of the first set is adapted to be connected to one end of an optical fiber of a first group of fibers, each module of the second set is adapted to be connected to one end of an optical fiber of a second group of fibers, and an optical fiber of the first group is adapted to be connected to an optical fiber of the second group by a jumper fiber which has two ends respectively received in a port of one of the modules of the first set and in a port of one of the modules of the second set. The first panel comprises at least one first connection module support to which are mounted at least some of the first set of modules, and the second panel comprises at least one first connection module support to which are mounted at least some of the second set of modules. The first and second panels each include a second connection module support. The second connection module supports cooperate with each other to form a stowage area for jumper fibers that are not in use.

By means of these features, the distribution frame of the invention is of simple configuration and optimizes the paths of jumper fibers between the stowage area and the functional area of the distribution frame, i.e. the area between the first connection module support of the first cross-connection panel and the first connection module support of the second cross-connection panel.

A preferred embodiment of the distribution frame of the invention includes one or more of the following features:

the second supports face each other;

the jumper fibers not in use are connected parallel to each other between the second support on the first panel and the second support on the second panel, each jumper fiber being arranged directly above the preceding one as and when it is stowed;

the jumper fibers are all the same length;

the first and second cross-connection panels each have first and second opposite sides respectively extending in a first direction and a second direction and the first and second connection module supports of the first cross-connection panel and the first and second connection module supports of the second cross-connection panel are adapted to rotate about a respective spindle extending in the first direction so that each support is adapted to be swung between a rest position, in which the support extends towards the exterior of the distribution frame at an angle to the first direction, and a working position, in which the support extends in the second direction;

each second connection module support is on one side of the associated cross-connection panel;

the ends of each jumper fiber extend in a third direction;

test means are adapted to test remotely any optical fiber of the first group or any optical fiber of the second group, or both, continuously or in response to a reported fault.

The present invention also provides a device for automatically connecting and disconnecting jumper fibers cross-connected in a distribution frame of the invention, which device is characterized in that it includes:

a main body, and a holding member which is mounted on said main body and adapted to grasp each end of a jumper fiber to be connected or to be disconnected, the device being conformed so that when the holding member is in the immediate vicinity of one end of said jumper fiber, in order to grasp that end, the whole of said main body is offset laterally relative to said end.

The above type of device has the advantage of making the distribution frame of the invention completely autonomous in terms of its cross-connection functions, eliminating "in situ" intervention by an operative in the context of operations such as creating, changing or canceling a subscriber line, applying remote surveillance to a line, etc. Furthermore, the conformation of the device eliminates all risk of interference of the device with adjacent jumper fibers when it connects or disconnects a chosen jumper fiber.

A preferred embodiment of the device of the invention includes one or more of the following features:

said holding member includes a tube with a longitudinal slot through which said jumper fiber end can pass and is oriented so that when it is in the immediate vicinity of said jumper fiber end said tube extends parallel thereto in the third direction;

the main body includes a deflector adapted to guide the jumper fiber downwards when said jumper fiber end is received in the tube of the holding member;

a retaining member is adapted to fasten one jumper fiber end to the holding member, after that end has been received into the tube of the holding member;

the retaining member is an elongate plate provided with a notch at one end and mobile in the first direction between a working position, in which said notch is positioned on the axis of the tube so as to receive one end of the jumper fiber to be disconnected, and a rest position, in which said end of the plate is set back relative to said tube;

a pusher member is adapted to be moved in the third direction to extract partly from the holding member one jumper fiber end to be connected that is engaged in the tube thereof;

means are provided for centering the holding member relative to a connection module port to which the connection or the disconnection of a jumper fiber end relates;

the centering means include a finger that extends beyond the holding member and is adapted to be accommodated in a notch in the first or second support for connection modules associated with the connection module to which the connection or the disconnection of a jumper fiber end relates, so that said device is positioned relative to said first or second connection module support before said jumper fiber end is connected or disconnected.

Another aspect of the invention is directed to a method of connecting a jumper fiber in a distribution frame of the invention using an automatic connection and disconnection device of the invention.

The method comprises:

a) moving the device into the stowage area, b) disconnecting a first jumper fiber end connected to the second support on the first cross-connection panel in said stowage area, c) moving said first fiber end towards the first support on the first cross-connection panel, d) connecting said first fiber end to a port of a module on said first support, e) moving the device into the stowage area, f) disconnecting a second fiber end connected to the second support on the second cross-connection panel in said stowage area, g) moving said second fiber end towards the first support on the second cross-connection panel, and h) connecting said second fiber end to a port of a module on said first support on the second cross-connection panel.

The foregoing steps have the advantage, not only of being very simple, but also of being few in number, because of the particular arrangement of the distribution frame. This also results in a non-negligible reduction in the cost of automating these steps.

A preferred embodiment of the device of the invention includes one or more of the following features:

the jumper fiber to be disconnected in the stowage area is at the highest level of that area;

the jumper fiber is connected above the mass of jumper fibers in use.

The present invention also provides a method of disconnecting a jumper fiber in a distribution frame of the invention using an automatic connection and disconnection device of the invention.

The above method comprising:

a) moving the device into the area between the first support on the first cross-connection panel and the first support on the second cross-connection panel, b) disconnecting a second end of said fiber connected to the first support on the second cross-connection panel, c) releasing said second fiber end into the mass of jumper fibers in use, d) disconnecting a first end of the fiber connected to the first support on the first cross-connection panel, e) extracting said jumper fiber from the distribution frame by an extractor device, and f) connecting said jumper fiber in the stowage area.

A preferred embodiment of a device of the invention includes one or more of the following features:

during the step e) traction is applied to said first end of said jumper fiber;

traction is applied to the jumper fiber above the first cross-connection panel;

the jumper fiber extractor device includes a pair of rollers between which said jumper fiber passes and which are adapted to be driven in rotation to feed said jumper fiber;

the rollers are covered with an elastically deformable material to espouse the shape of said jumper fiber as it passes between the rollers.

BRIEF DESCRIPTION OF THE DRAWINGS

A preferred embodiment of the invention is described hereinafter with reference to the accompanying drawings, and in a non-limiting manner.

FIG. 5 is a fragmentary perspective view in section of the FIG. 4 device, showing its main components, FIG. 6 is a perspective view of a detail of a handling member of the FIG. 4 device.

DETAILED DESCRIPTION OF THE DRAWINGS

Figure 1:
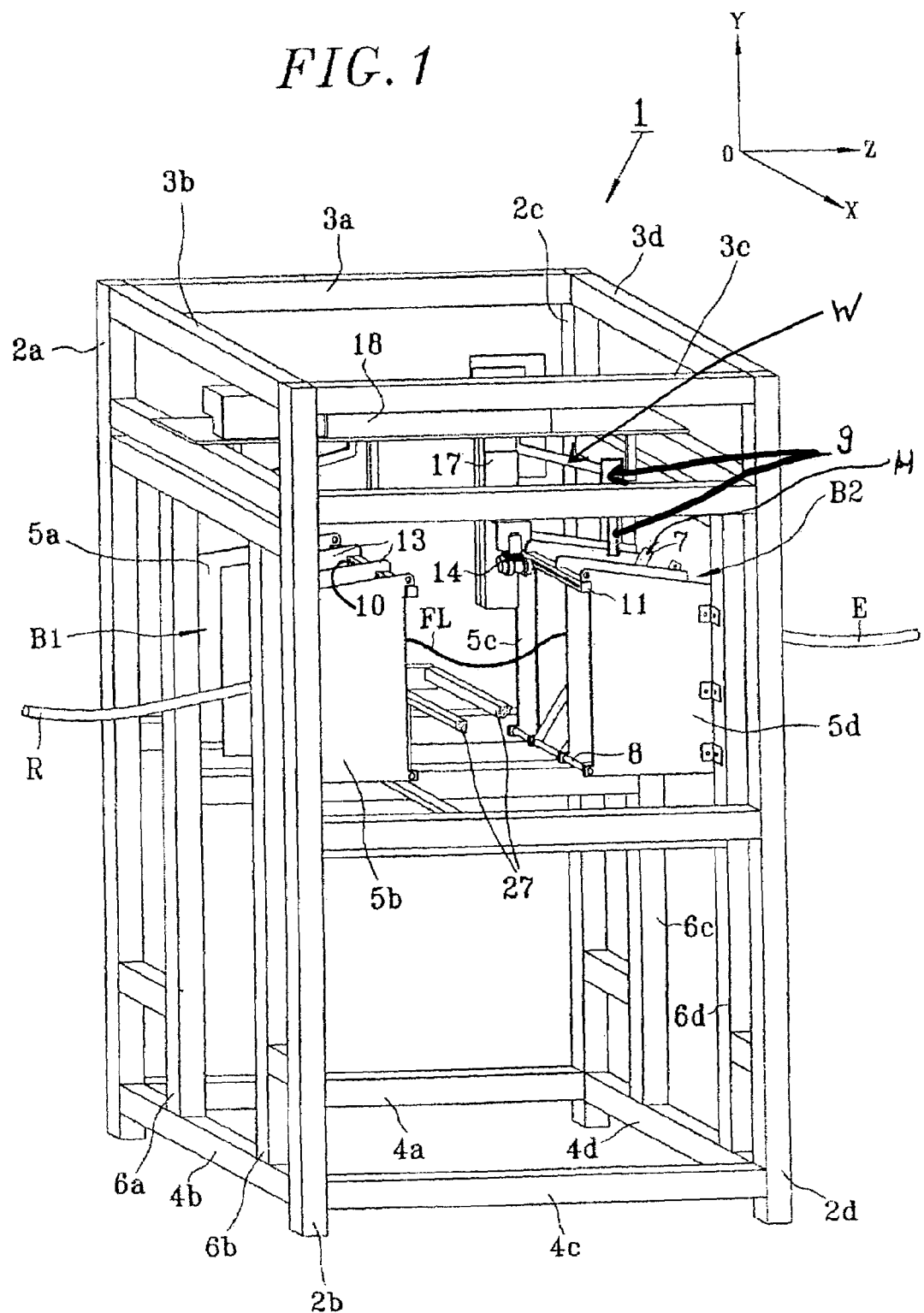
FIG. 1 is a diagrammatic overall perspective view of a distribution frame and an associated automatic connection and disconnection device.

Referring to FIG. 1, a distribution frame of the invention has a metal structure 1 substantially in the form of a rectangular parallelepiped, which structure essentially comprises four uprights 2a, 2b, 2c and 2d, four top cross-members 3a, 3b, 3c and 3d and four bottom cross-members 4a, 4b, 4c and 4d. The cross-members 3b, 3d, 4b, 4d extend in a first direction X, which is horizontal in this example. The uprights 2a, 2b, 2c, 2d extend in a second direction Y, which is vertical in this example. The cross-members 3a, 3c, 4a, 4c extend in a third direction Z, which is horizontal and perpendicular to the directions X and Y in this example.

To the top left-hand and right-hand portions of the structure 1 are respectively fixed first and second cross-connection panels B1 and B2 which are symmetrical with respect to a vertical plane coinciding with the median transverse plane of the rectangular parallelepiped formed by the structure 1. The first cross-connection panel B1 is delimited by two parallel support plates 5a, 5b, each of which extends vertically inside the structure 1 in a plane defined by the direction Y and the direction Z. The plates 5a, 5b are fixed by respective vertical edges to spaced vertical beams 6a, 6b between the two uprights 2a, 2b of the structure 1. In a similar way, the second cross-connection panel B2 is delimited by two support plates 5c, 5d which are fixed by respective vertical edges to spaced vertical beams 6c, 6d between the two uprights 2c, 2d of the structure 1.

Between the two support plates 5a, 5b, and likewise between the support plates 5c, 5d, are several connection module supports 7.

Figure 2:
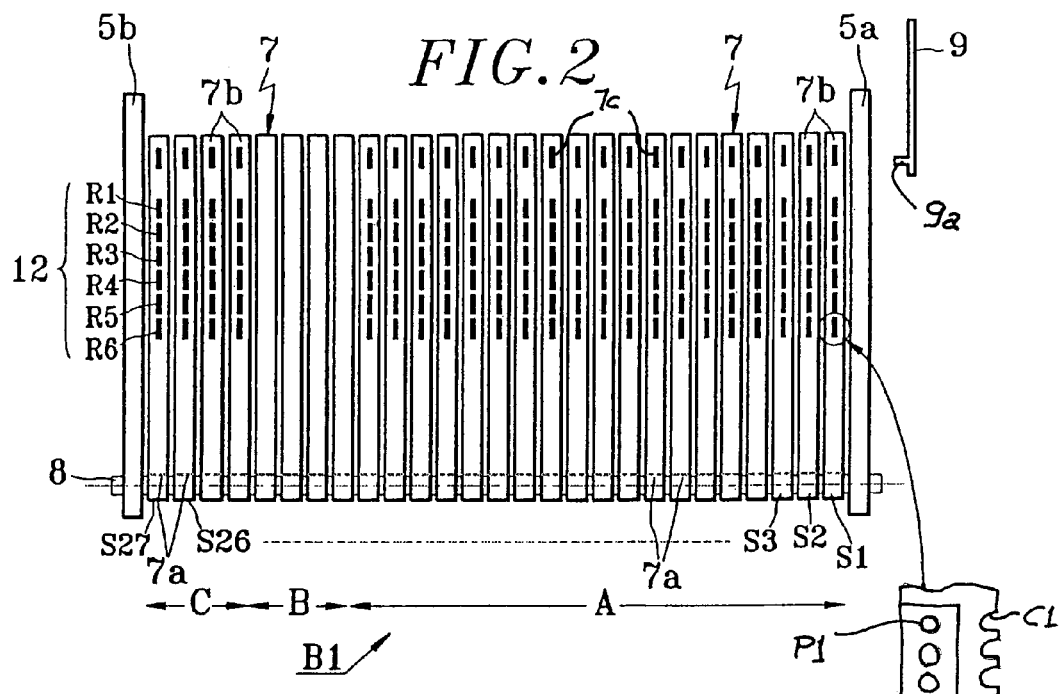
FIG. 2 is a diagrammatic front view of a first cross-connection panel of the FIG. 1 distribution frame.
Figure 3:
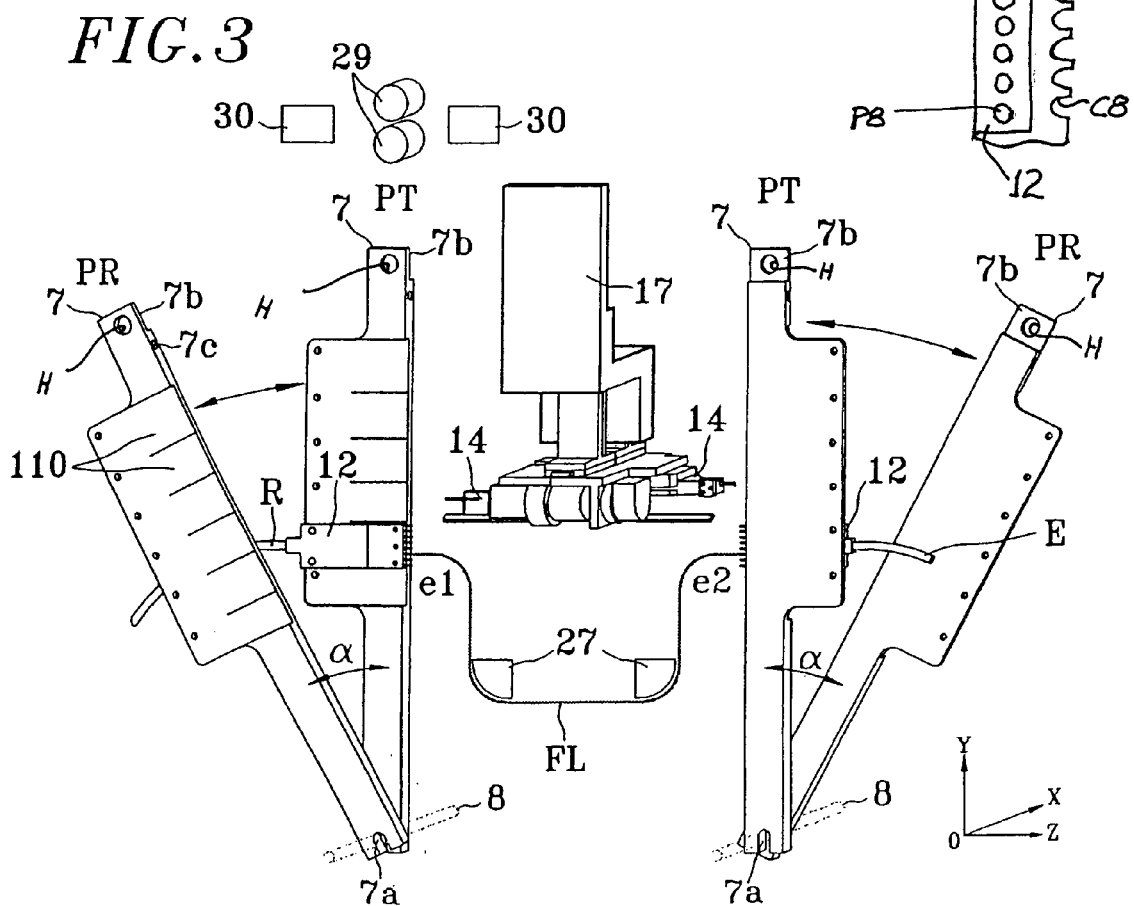
FIG. 3 is a view of a detail of the FIG. 1 distribution frame and shows an automatic connection and disconnection device between a connection module support of the first cross-connection panel and a connection module support of a second cross-connection panel.

As shown better in FIGS. 2 and 3, the supports 7 take the form of parallel bars.

Referring to FIGS. 1 to 3, the supports 7 each have a bottom end 7a articulated about a fixed rotation spindle 8 (FIG. 1) between the two support plates 5a, 5b (respectively 5c, 5d), which spindle is fixed at its opposite ends and extends in the first direction X. Said supports 7 each have a top end 7b fastened to a lifting arm 9 (FIG. 2) attached to one end of the first and second cross-connection panels by any appropriate fixing means known in the art.

Accordingly, and as shown more clearly in FIG. 3, each support 7 can swing between a working position PT, in which the support 7 extends vertically in the second direction Y, and a rest position PR, in which the support 7 extends towards the exterior of the structure 1 at an angle a to the second direction Y.

The function of arm 9 is to lift each support 7 separately into the working position for the connection/disconnection, and after this operation is completed, to pull down that same support 7 into the rest position. As shown in FIG. 2, arm 9 has a finger 9a which cooperates with hole H shown in FIG. 3 in order to lift support 7 from its rest position to its working position. With reference to FIG. 1, arm 9 translates along axis Z on a rail W by means of an endless screw (not shown) connected to arm 9 and controlled by a motor (not shown) installed on the member 18. When finger 9a arrives in front of hole H, arm 9 is moved along axis X so that finger 9a cooperates with hole H. After that, arm 9 is moved again along axis Z in order to lift support 7.

To locate the supports 7 correctly in their working position PT, the top end 7b of each support 7 includes an opening 7c (FIG. 2) adapted to cooperate with a centering peg 10 on a cross-member 11 (FIG. 1) that connects the two support plates 5a, 5b (respectively 5c, 5d). Cross-member 11 carries pegs 10 corresponding in number to supports 7 on the panel. Each of pegs 10 extends in direction Z toward its corresponding support. Each support 7 has an opening 7c (FIG. 3) which is located in such a position that when the support is in its working position PT, peg 10 fits into opening 7c. This serves to more accurately align support 7 in its working position.

As shown more clearly in FIG. 3, in this example each support 7 includes six compartments 110, which are all the same size and equally distributed in the longitudinal direction along a portion of the support 7. The compartments 110 are each conformed to receive a connection module 12, which in this example takes the form of a thin rectangular parallelepiped. Only one module 12 can be seen in its entirety in FIG. 3. The modules clip into the compartments, for example. The connection modules are preferably of the type described in the document FR 2 774 181, which is hereby incorporated by reference.

The module 12 shown on the left-hand side in FIG. 3 belongs to a support 7 on the first cross-connection panel B1. The module 12 extends towards the left to receive one end of an optical fiber cable R coming from the network. The module 12 of which only a very small portion is shown on the right-hand side of FIG. 3 belongs to a support 7 on the second cross-connection panel B2. This module 12 extends towards the right to receive one end of an optical fiber cable E connected to user equipment.

As shown in FIGS. 2 and 3, in this example the right-hand end of the connection module 12 of the first cross-connection panel B1 has eight ports numbered P1 to P8 from top to bottom. These ports are each adapted to receive a plug 20 (FIG. 4) shown at a first end e1 of a jumper fiber FL.

Figure 4:
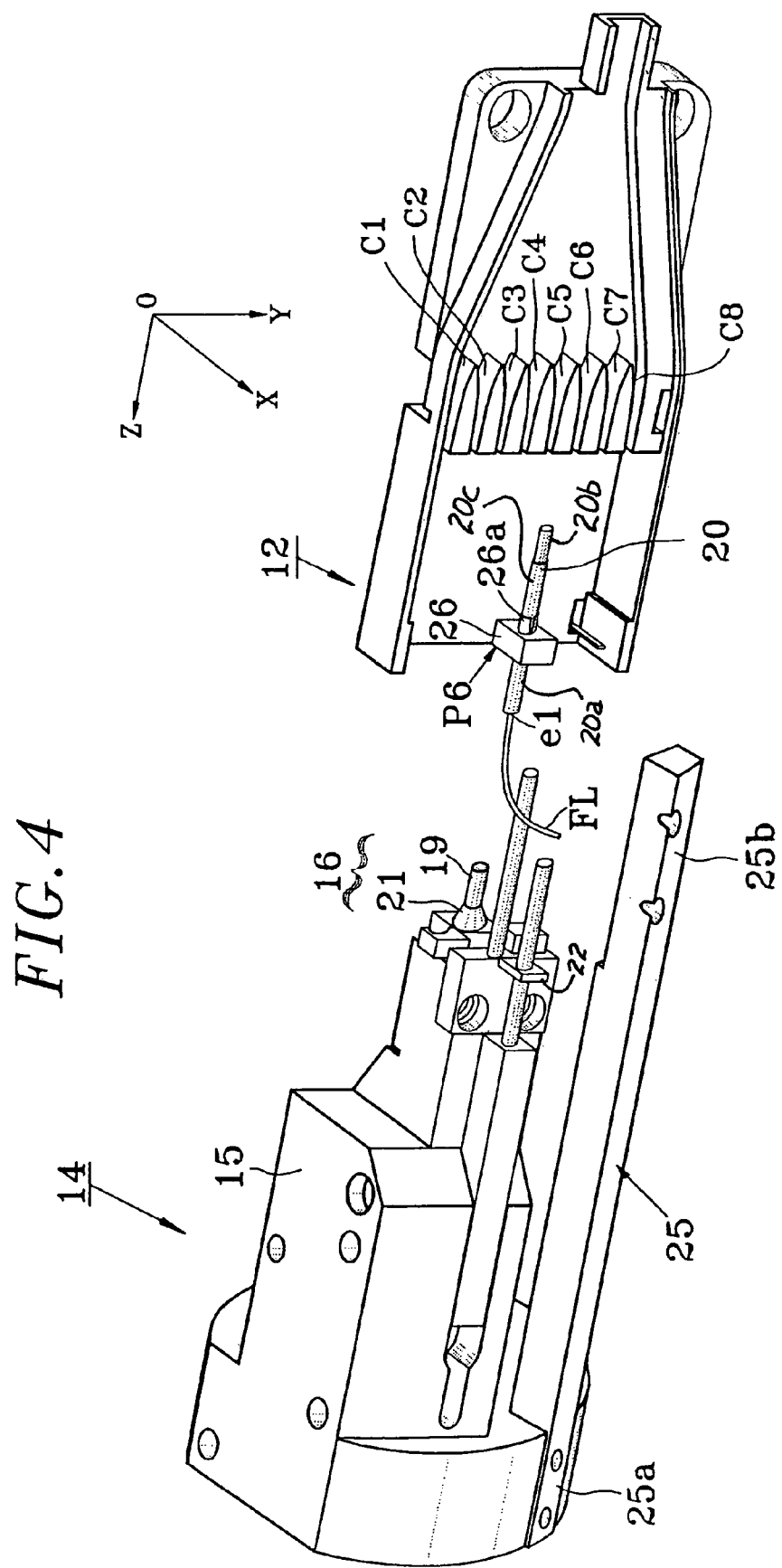
FIG. 4 is a perspective view of a device for automatically connecting/disconnecting jumper fibers cross-connected in the FIG. 1 distribution frame, showing the device in the vicinity of a connection module.

As shown more clearly in FIG. 4, plug 20 extends in the third direction Z and is locked to a port of a module 12, for example the port P6, by a clip 26 attached to module 12 and located on the axis of the port. Further details about this attachment will become clear from a discussion of FIGS. 7 and 8 presented below.

Referring again to FIGS. 2 and 3, like the right-hand end of the connection module 12 of the first cross-connection panel B1, the left-hand end of the connection module 12 of the second cross-connection panel B2 has eight ports each adapted to have clipped to it a plug 20 at a second end e2 of the jumper fiber FL and extending in the third direction Z. It should be noted that the number of jumper fibers FL that can be connected in a connection module 12 is always equal to the number of optical fibers contained in a cable R.

It should further be noted that, given the symmetry of the structure 1, the jumper fibers FL are all the same length. To avoid overcomplicating the figures, FIGS. 1 and 3 show only one jumper fiber FL.

Referring to FIGS. 2 and 3, the inclination angle α, the number of connection modules 12 per support 7, and the distance between the lowest compartment 110 and the spindle 8 are determined so that when the supports 7 are in their rest position the jumper fibers FL are not in contact with the automatic connection and disconnection device described hereinafter.

Referring to FIG. 1, the supports 7 are preferably separated from each other by a partition 13 which is parallel either to the support plates 5a, 5b or to the support plates 5c, 5d, depending on the cross-connection panel B1 or B2 concerned. For example, each partition 13 takes the form of a substantially rectangular sheet coated with a plastic material and fixed to the associated cross-connection panel by any appropriate means. In this way, each support 7 is isolated from its neighbor supports so that, on rotating a support 7, the jumper fibers FL thereon do not come into contact with the jumper fibers FL or the modules 12 on adjacent supports.

Referring again to FIG. 2, the cross-connection panel B1 and, symmetrically thereto, the cross-connection panel B2 have a first portion A that includes a plurality of supports 7, for example nineteen supports numbered S1 to S19, a second portion B with no supports 7 but able to accommodate a plurality of supports 7, for example four supports numbered S20 to S23, and a third portion C that includes a plurality of supports 7, for example four supports numbered S24 to S27. The six compartments 110 of any support 7 on the first cross-connection panel B1 are referenced R1 to R6 from top to bottom and the six compartments 110 of any support 7 on the second cross-connection panel B2 are referenced E1 to E6 from top to bottom. The two cross-connection panels B1 and B2 are disposed relative to each other so that:

the area between the first portion A of the first cross-connection panel B1 and the first portion A of the second cross-connection panel B2 serves as a functional area of the distribution frame, i.e. an area adapted to contain the surplus lengths of jumper fibers FL in use that connect a connection module 12 on any of the first 19 supports on the cross-connection panel B1 to a connection module 12 on any other of the first 19 supports on the cross-connection panel B2, the area between the second portion B of the cross-connection panel B1 and the second portion B of the cross-connection panel B2 provides a spare area for the functional area, for example if the latter is completely used up, and the area between the third portion C of the first cross-connection panel B1 and the third portion C of the second cross-connection panel B2 serves as a stowage area of the distribution frame, i.e. an area adapted to contain jumper fibers FL not in use and awaiting connection in the functional area. As and when they are stowed, the jumper fibers FL are installed one above the other in the stowage area, starting from the port P8 of the lowest module 12 on the respective support 7 on the first cross-connection panel B1 and the corresponding support 7 on the second cross-connection panel B2. Accordingly, once stowed, the jumper fibers FL are all parallel.

This optimizes the path of the jumper fibers FL between the functional area and the stowage area. Optimizing the path in this way greatly facilitates installing the jumper fibers by avoiding all risk of entangling of the jumper fibers in the functional area and those in the stowage area. It also maximizes the flexibility of the distribution frame, combined with great flexibility in terms of capacity, which can vary over a range from about one hundred to a few thousand subscribers.

Finally, the novel arrangement of the stowage area on one side of the functional area of the distribution frame provides easy access to the stowage area for an operative. It also enables good management of the surplus lengths of jumper fibers FL, each jumper fiber to be stowed being moved in translation from the functional area to prevent any risk of tangling, as occurs in prior art distribution frames, where jumper fibers are not moved laterally in translation but moved more or less at random above the mass of jumper fibers, which causes tangling of the surplus lengths of jumper fibers.

The device for automatically connecting and disconnecting jumper fibers associated with the distribution frame just described is described next with reference to FIGS. 4 to 6.

It should be noted that the device is described by way of non-limiting example only and that it is obvious that any other automatic connection and disconnection device that can be adapted to the distribution frame of the invention could be used instead.

With particular reference to FIG. 4, the device 14 for automatically connecting and disconnecting jumper fibers has a main body 15 which is of substantially elongate shape in this example. A holding member 16 adapted to pick up an end of a jumper fiber FL to be connected or disconnected is fixed to one end of the main body 15.

As shown in FIG. 1, because of the relative symmetry of the first and second cross-connection panels B1 and B2, two connection and disconnection devices 14 are used, one associated with the first cross-connection panel B1 and the other associated with the second cross-connection panel B2. The two devices are fastened to a common support 17 that is fixed to a carriage 18 which can be moved in translation in the directions X, Y and Z on rails or slides (not shown) by control software.

A single connection and disconnection device 14 could be used instead of two, in which case it would have a pivoting head fastened to the holding member 16 and adapted to be oriented towards either the cross-connection panel B1 or the cross-connection panel B2.

FIG. 5 shows device 14 from a view available after it has been turned by 180° around a vertical axis in order to show such parts as 19, 20, 23 and 24. As shown in FIGS. 5 and 6, the holding member 16 primarily includes a slotted tube 19 whose inside diameter is very slightly greater than the outside diameter of a plug 20 at one end, for example the end e1, of a jumper fiber FL.

The holding member 16 has a substantially frustoconical outside profile 21 which, when the connection and disconnection device 14 is in use, widens in the direction of the interior of the structure 1 of the distribution frame.

As shown in FIG. 6, the frustoconical exterior profile 21 acts as a deflector which guides in the downward direction the jumper fiber FL whose plug 20 is held in the slot of the tube 19.

Referring again to FIGS. 4 and 5, the connection and disconnection device 14 is designed so that, for the purposes of a connection or a disconnection, it is moved transversely relative to the cross-connection panel B1 or B2, in the direction of the module 12 of the panel to which the connection or disconnection relates, its holding member 16 then moving in front of the supports 7 on the cross-connection panel B1 or B2 before reaching the support 7 containing said module 12. All the supports 7 are at this time swung to the rest position PR so that the connection and disconnection device 14 cannot disorganize or damage the connected jumper fibers FL. When the connection and disconnection device 14 is in the vicinity of the support 7 to which the connection or disconnection relates, the latter is swung to the vertical working position PT, all the other supports 7 remaining in the rest position PR.

When the slot of the tube 19 is near the port of the module 12 to which the connection or the disconnection relates, i.e. the port P6 in the FIG. 4 example, the entire device is shifted laterally relative to said module 12, the tube 19 of the holding member 16 extending along an axis parallel to the axis of the port P6, which is itself parallel to the third direction Z. Each plug 20 at the end of a jumper fiber FL is therefore always connected or disconnected along the axis of the port and then moved laterally in translation relative to the axis of the port. The benefit of this is that at the time of a connection or a disconnection there is no risk of the connection and disconnection device 14 coming into contact with the jumper fibers connected to other ports of the module 12 to which the connection or the disconnection relates.

Referring again to FIG. 5, the connection and disconnection device 14 includes a retaining member 22 which is adapted to fasten the plug 20 at the end e1 of the jumper fiber FL to the connection and disconnection device 14. The holding member 22 takes the form of an elongate and substantially rectangular plate that slides in the direction X inside the frustoconical portion 21. The end of the plate nearest the frustoconical portion 21 has a notch 23 whose contour substantially corresponds to that of the plug 20. Said plate is adapted to slide between a rest position, in which the axis of the notch 23 is offset from the axis of the plug 20, and a working position, shown in FIG. 5, in which the axis of the notch 23 coincides with the axis of the plug 20, which is housed in the notch 23. In this latter position, the plate 22 is immobilized relative to the holding member 16, to which end the plate 22 is provided with an external shoulder 22a that abuts against a corresponding internal shoulder 21a of the frustoconical portion 21.

The connection and disconnection device 14 further includes a pusher member 24 in the form of an elongate cylinder extending in the direction Z and adapted to slide in that direction. The pusher member 24 has a tubular portion 24a whose inside diameter is very slightly greater than the outside diameter of the rear portion of the plug 20 so that the latter can be held in close contact with the interior of the tubular portion 24a. The function of the pusher member 24 is to help expel the plug 20 partly out of the holding member 16 when making a connection. To this end, the pusher member 24 can slide from a rest position, shown in FIG. 5, in which it is aligned with and to the rear of the plug 20, to a working position, in which it surrounds the end 20a of the plug 20 opposite the free end 20b thereof. It should be noted that the retaining member 22 must be in the rest position before moving the pusher member 24 into its working position. The pusher member 24 is then moved in the direction of the holding member 16 until the tubular portion 24a abuts against the interior of the frustoconical portion 21 of the holding member 16. This displacement of the pusher member 24 partly extracts the plug 20 from the holding member 16.

Referring now to FIG. 4, the connection and disconnection device 14 further includes a centering finger 25 in the form of a bar extending beyond the tube 19 of the holding member 16 in the direction Z, for example to a distance of 13 mm, said finger being offset laterally relative to the axis of the tube 19. A first end 25a of said finger is fixed to the main body 15 of the connection and disconnection device 14 and its second end 25b points towards the module 12 to which the connection or the disconnection of a jumper fiber FL relates.

When the connection and disconnection device 14 is very close to the module 12, and before the connection or disconnection is effected, the end 25b of the centering finger 25 enters a compartment C6 of the module 12 that forms a notch offset laterally relative to the axis of the port P6 to which the connection or the disconnection relates, so as to position the connection and disconnection device 14 relative to the module 12 in a stable and accurate manner. The module 12 shown has a number of compartments equal to the number of ports P1 to P8 of the module 12, i.e. eight compartments C1 to C8, equally distributed over the whole of the height of the module 12. The two cylindrical rods 50 and 52 which are more clearly shown in FIG. 5, serve to mechanically index device 14 as precisely as possible to avoid damaging plug 20. Cooperative notches (not shown) are provided on support 7.

Finally, the connection and disconnection device 14 also includes a sensor (not shown) for detecting, in the case of a connection, that the jumper fiber FL is no longer in the connection and disconnection device 14 and, in the case of a disconnection, that the jumper fiber FL is in the connection and disconnection device 14.

The steps leading to the connection of a jumper fiber FL awaiting connection in the stowage area of the distribution frame are described next with reference to FIGS. 1 to 8.

Referring to FIGS. 1 and 2, the connection and disconnection device 14 oriented toward the first cross-connection panel B1 is moved in translation over the mass of jumper fibers FL in use, in the direction X, toward a support 7 chosen from a plurality of supports S24 to S27 on the third portion C of the first cross-connection panel B1. All the supports 7 on the first panel B1 are then swung to their rest position PR. As soon as the device 14 reaches the vicinity of the support 7 to which the disconnection of a first end e1 of a jumper fiber FL relates, for example the support S25, said support is swung up into its working position PT.

Figure 7A:
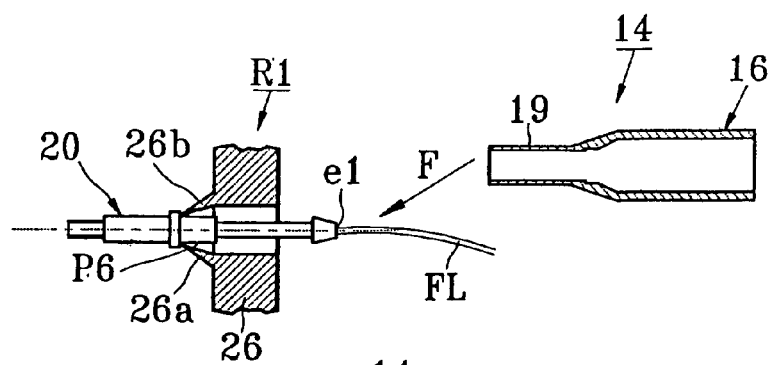
FIGS. 7A to 7D are diagrammatic views in section representing the steps of disconnecting a jumper fiber end from a connection module port.

As shown in FIG. 7A, the connection and disconnection device 14 is then moved in the directions X, Y and Z to position the free end of the tube 19 of the holding member 16 on the axis of the plug 20 at a first end e1 of the jumper fiber FL, said plug 20 being locked into a port of the module 12 to which the disconnection relates, for example the port P6 of the module R1. To this end, the control software automatically positions the free end of the tube 19 relative to the plug 20, which is necessarily the highest one in the stowage area, to prevent all risk of tangling the surplus lengths of the connected jumper fibers FL.

The positioning of the connection and disconnection device 14 along the X, Y and Z axes relative to the axis of the plug 20 or of the port P6 concerned is particularly advantageous in that it is not necessary to use other control axes of the automatic connection and disconnection device 14, which reduces the cost of automating the movements of the device. This also has the advantage of reducing the risk of breakdowns, to which is added an optimum reduction of the overall size by limiting to three the number of guide rails of the carriage 18 that supports the two automatic connection and disconnection devices 14.

Figure 7B:
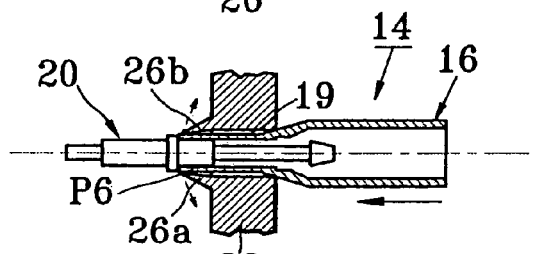

As shown in FIG. 7B, when the previous step has been completed, the connection and disconnection device 14 is moved in translation in the direction Z so that the tube 19 enters the port P6 and the rear portion of the plug 20 is surrounded by the tube 19, which is itself surrounded by the clip 26 corresponding to the port P6. The movement of the connection and disconnection device 14 in translation along the Z axis continues until the free end of the tube 19 abuts against an external annular projection 20c on the front portion of the plug 20, which moves apart the two diametrically opposite elastic lugs 26a, 26b of the clip 26.

It should be noted that during the previous two steps the holding member 22 and the pusher member 24 (FIG. 5) of the connection and disconnection device 14 are both in the rest position.

Figure 7C:
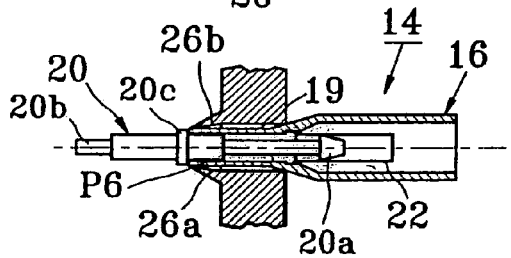

As shown in FIG. 7C, the holding member 22 is then moved in translation in the direction X towards the plug 20 so that the rear end 20a of the latter enters the notch 23 of the holding member 22, as described above. The plug 20 is then fastened to the holding member 16 of the connection and disconnection device 14.

Figure 7D:
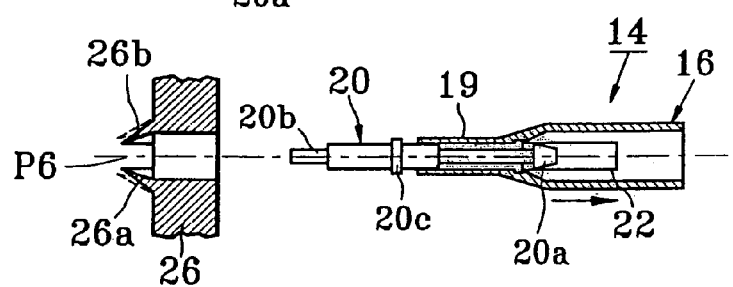

As shown in FIG. 7D, the connection and disconnection device 14 is moved in translation in the direction Z away from the port P6, the projection 20c on the plug 20 spreading apart the lugs 26a, 26b of the clip 26 as it enters the latter; the lugs subsequently return to their initial rest position by virtue of their elasticity. This disconnects the plug 20 at the end e1 of the jumper fiber FL.

When the above step has been completed, the support S25 is swung to the rest position PR and the automatic connection and disconnection device 14 is moved in translation over the mass of jumper fibers in use, in the direction X towards a support 7 chosen from the plurality of supports S1 to S19 on the first portion A of the first cross-connection panel B1. As soon as the device 14 reaches the vicinity of the support 7 to which the connection of the first end e1 of the jumper fiber FL relates, for example the support S17, said support is swung up into its working position PT.

Figure 8A:
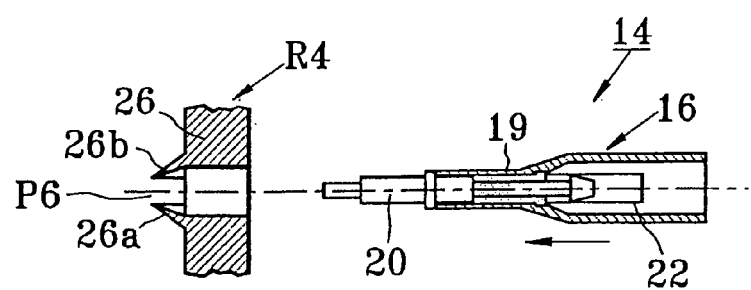
FIGS. 8A to 8F are diagrammatic views in section showing the steps of connecting a jumper fiber end to a connection module port.

As shown in FIG. 8A, the connection and disconnection device 14 is then moved in the directions X, Y and Z to position the free end of the tube 19 of the holding member 16, which is interengaged with the plug 20 to be connected, on the axis of a port of the connection module 12 to which the connection of the plug 20 at the end e1 relates, for example the port P6 of the module R4. The control software positions the front end 20b of the plug 20 in the immediate vicinity of the mouth of the port P6 of the module R4.

Figure 8B:
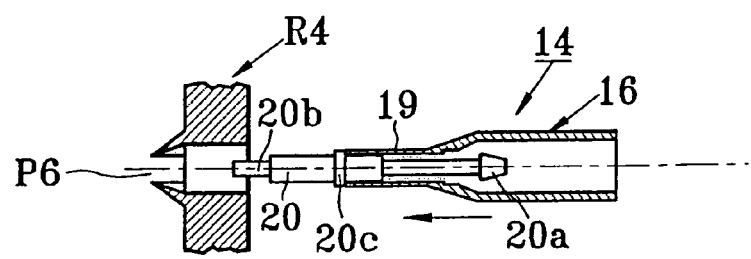

As shown in FIG. 8B, to separate the plug 20 from the holding member 16, the holding member 22 is then moved in translation in the direction X as far as its rest position.

Figure 8C:
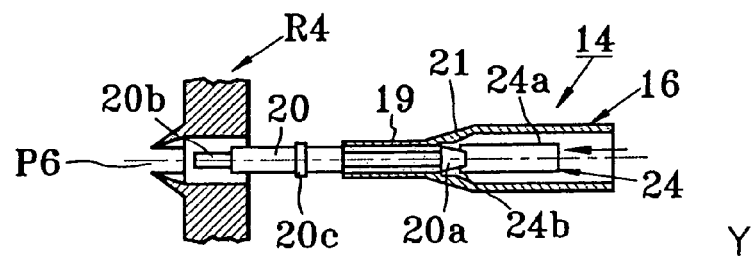

As shown in FIG. 8C, the pusher member 24 is then moved in translation in the direction Z towards the port P6 to interengage the free end 24b of its tubular portion 24a with the rear end 20a of the plug 20. The movement in translation of the pusher member 24 in the direction Z continues until the free end 24b of its tubular portion 24a abuts against the interior of the frustoconical portion 21 of the holding member 16, which extracts the plug 20 partly from the tube 19 of the holding member 16.

Figure 8D:
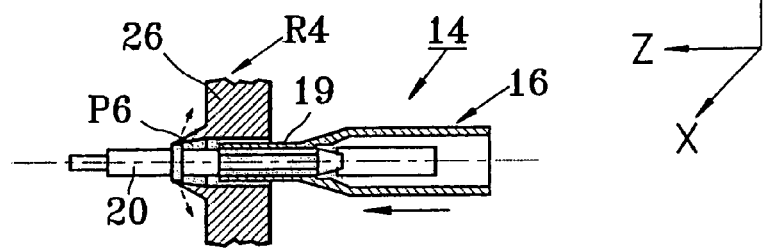

As shown in FIG. 8D, once the previous step has been completed, the connection and disconnection device 14 is moved in translation in the direction Z so that the tube 19 enters the port P6, at which time the rear portion of the plug 20 is surrounded by the tube 19, which is itself surrounded by the clip 26 corresponding to the port P6.

Figure 8E:
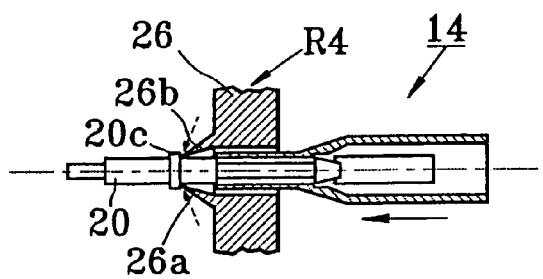

As shown in FIG. 8E, the movement in translation of the connection and disconnection device 14 in the direction Z continues so that the annular projection 20c on the plug 20 spreads apart the two elastic lugs 26a, 26b of the clip 26. The movement in translation of the connection and disconnection device 14 in the direction Z stops when the lugs 26a, 26b of the clip have returned to their initial rest position, after entry of the projection 20c into the clip 26, the lugs 26a, 26b being abutted against the projection 20c.

Figure 8F:
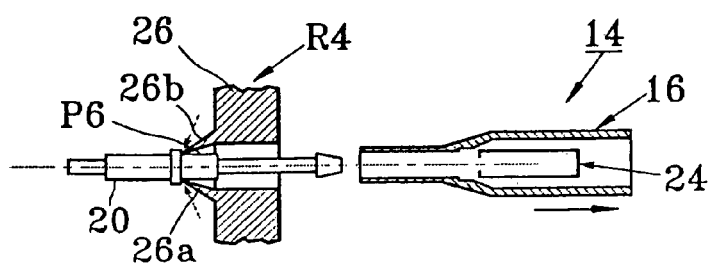

As shown in FIG. 8F, the plug 20 is locked into the port P6, i.e. connected, and the connection and disconnection device 14 can be moved in translation in the direction Z away from the port P6.

The support S17 is then swung to the rest position PR.

Referring to FIGS. 1 and 2, the connection and disconnection device 14 oriented towards the second cross-connection panel B2 is in turn moved in translation over the mass of jumper fibers FL in use, in the direction X towards the support S25 on the third portion C of the second cross-connection panel B2. As previously mentioned, this support is necessarily affected by the disconnection of a second end e2 of the jumper fiber FL, the distribution frame being designed so that the ends e1, e2 of each jumper fiber FL connected in the stowage area are at the same level, to prevent all risk of tangling jumper fibers FL in the stowage area. All the supports 7 on the second cross-connection panel B2 are then swung to their rest position PR. As soon as the connection and disconnection device 14 reaches the vicinity of the support S25, that support is swung up into its working position PT.

Steps in all respects similar to those described with reference to FIGS. 7A to 7F are then repeated.

It is obvious that the support 7 on the first portion A of the second cross-connection panel B2 is not necessarily the support S17, the choice of the support 7 depending on the cable E to be connected to the cable R.

When the above steps have been completed, the jumper fiber FL is connected in the functional area of the distribution frame, as shown in FIG. 3.

The steps leading to the disconnection of a jumper fiber FL in the functional area and to the connection of that fiber in the stowage area of the distribution frame are described next with reference to FIG. 3.

To simplify the example, the disconnection and stowage of the jumper fiber FL whose connection has just been described are described with reference to the same supports in the functional area, namely the supports S17, and the same supports in the stowage area, namely the supports S25.

The steps of disconnecting a jumper fiber FL and the steps of connecting that fiber in the stowage area are preferably not the reverse of those just described with reference to FIGS. 7A to 8F. This is because simply reversing those steps would cause tangling of the jumper fibers FL, which is undesirable as it may compromise correct operation of the distribution frame.

The steps described hereinafter make use of three additional components associated with the distribution frame and shown in FIG. 3.

A first of these components consists of two bars 27 extending in the direction X and in front of the first and second cross-connection panels B1, B2, respectively, as shown in FIG. 1, which represents the situation in which the bars 27 are swung into the raised position, which is adopted when connecting a jumper fiber FL in the functional area of the distribution frame.

FIG. 3 shows the situation in which the bars 27 are swung to a lowered position to concentrate the mass of connected jumper fibers FL towards the bottom of the structure 1 of the distribution frame. As described in more detail hereinafter, this facilitates extracting a jumper fiber FL from the functional area, the mass of jumper fibers FL in use being retained in the lower portion of the functional area of the distribution frame.

A second of the components referred to above consists of a pair of rollers 29 that extend in the direction X above the crossmember 11 (FIG. 1) of one of the cross-connection panels, the panel B1 in the example shown in FIG. 3. The rollers 29 are arranged relative to each other so that they can move towards or away from each other in the direction Y to grip the jumper fiber FL disconnected in the functional area of the distribution frame. One of the rollers is driven by a motor and the other is an idler roller. The rollers 29 are preferably covered with an elastically deformable material, such as rubber, to espouse the shape of the jumper fiber FL that passes between them. Rotation of the rollers 29 feeds the jumper fiber so that it can be extracted from the functional area of the distribution frame before it is connected in the stowage area.

The third of the components referred to above consists of a pair of clamps 30, each of which can be moved in translation in the directions X and Z. In the embodiment shown in FIG. 1, like the automatic connection and disconnection devices 14, the clamps 30 (which are not shown in FIG. 1) are guided by the carriage 18, with the aim of eliminating the need for another guide carriage, which would increase the overall size of the distribution frame.

As shown in FIG. 3, a first clamp 30 is dedicated to the first cross-connection panel B1 and the second clamp 30 is dedicated to the second cross-connection panel B2. The first clamp 30 is also adapted to pivot towards the exterior of the structure 1 of the distribution frame on the rotation spindle 8 of the supports 7, through an angle of approximately 120°.

The bars 27 are swung to their lowered position before disconnecting the jumper fiber FL.

The connection and disconnection device 14, oriented toward the second cross-connection panel B2, is moved in translation above the mass of jumper fibers in use, in the direction X towards the support 7 associated with the plug 20 of the jumper fiber FL to be disconnected, which is the support S17 on the first portion A of the second cross-connection panel B2 in this example. All the supports 7 of the second cross-connection panel B2 are then swung into their rest position PR.

As soon at the automatic connection and disconnection device 14 reaches the vicinity of the support S17, that support is swung up into its working position PT.

The connection and disconnection device 14 then disconnects the plug 20 at the second end e2 of the jumper fiber FL in the same manner as described with reference to FIGS. 7A to 7D.

The second clamp 30 is moved in translation in the direction X in order to position it substantially in front of the connection and disconnection device 14. The latter is moved in translation in the direction Z as close as possible to the second clamp 30. The latter is operated to grasp the plug 20 engaged in the tube 19 of the handling member 16 of the connection and disconnection device 14. Once this operation has been completed, the retaining member 22 of the connection and disconnection device 14 is moved in translation to its rest position.

The automatic connection and disconnection device 14 is moved away from the second clamp 30, which is opened to release the plug 20 at the end e2 of the jumper fiber FL and leave it on the bars 27.

The connection and disconnection device 14, oriented toward the first cross-connection panel B1, is in turn moved in translation above the mass of jumper fibers in use, in the direction X towards the support 7 associated with the plug 20 of the jumper fiber FL to be disconnected, which is the support S17 on the first portion A of the first cross-connection panel B1 in this example. All the supports 7 on the first cross-connection panel B1 are then swung into their rest position PR.

As soon as the automatic connection and disconnection device 14 reaches the vicinity of the support S17, that support is swung up into its working position PT.

The connection and disconnection device 14 then disconnects the plug 20 at the first end e1 of the jumper fiber FL in the manner described with reference to FIGS. 7A to 7D.

The connection and disconnection device 14 is then moved in translation in the direction Z as close as possible to the first clamp 30. The latter is operated to grasp the plug 20 engaged in the tube 19 of the holding member 16 of the device 14. Once this operation has been completed, the holding member 22 of the automatic connection and disconnection device 14 is moved in translation to its rest position and the automatic connection and disconnection device 14 is moved away from the first clamp 30, which is then moved in translation in the direction Z to a position slightly to the rear of the support S17 on the first cross-connection panel B1. The first clamp 30 is then rotated towards the exterior of the structure 1 of the distribution frame, which moves at least a portion of the jumper fiber to be extracted out of the functional area of the distribution frame.

The pair of rollers 29 is moved in translation in the direction X until it reaches the support S17 on the first cross-connection panel B1. The rollers 29 are moved away from each other on either side of the jumper fiber FL to be extracted and then moved towards each other to interengage with said fiber. The rollers 29 are then driven in rotation, which feeds the jumper fiber FL towards the left-hand exterior side of the structure 1 of the distribution frame, until the plug 20 at the second end e2 of said jumper fiber FL abuts against the two rollers, which causes them to cease rotating. Once this operation has been completed, the jumper fiber FL forms a loop on the left-hand side of the distribution frame, beside its structure 1.

During the next step, the rollers 29 and the two clamps 30 are moved in translation in the direction X towards the stowage area. The second clamp 30 is then moved in the direction Z towards the rollers 29 as close as possible to the plug 20 of the second end e2 of the jumper fiber FL engaged in the rollers 29. The second clamp 30 grasps said plug and is then moved in translation in the direction Z to a position in front of the automatic connection and disconnection device 14 associated with the second cross-connection panel B2. To this end, the rollers are rotated briefly to impart some slack to the jumper fiber, so that it is not subjected to excessive traction during movement of the second clamp 30 in translation in the direction Z.

Said connection and disconnection device 14 recovers the plug 20 in the second clamp 30 and is then moved in translation in the direction X to a position in front of the support S25 of the second cross-connection panel B2.

The connection and disconnection device 14 then connects the second end e2 of the jumper fiber FL to the support S25 on the second cross-connection panel B2 in the same manner as described with reference to FIGS. 8A to 8F.

The rollers 29 are briefly rotated again so that when the first clamp 30 is swung toward the interior of the structure 1 of the distribution frame there is no risk of any slack in the jumper fiber FL above the second cross-connection panel B2.

The rollers 29 are moved apart and the first clamp 30 is moved in translation in the direction Z to a position in front of the automatic connection and disconnection device 14 associated with the first cross-connection panel B1.

The connection and disconnection device 14 recovers the plug 20 in the first clamp 30 and is then moved in translation in the direction X to a position in front of the support S25 on the first cross-connection panel B1.

The connection and disconnection device 14 then connects the first end e1 of the jumper fiber FL to the support S25 on the first cross-connection panel B1 in the same manner as described with reference to FIGS. 8A to 8F.

Once this operation has been completed, the jumper fiber FL is connected in the stowage area of the distribution frame and is therefore ready for a subsequent connection in the functional area.

The schematic depiction of plug 20 in FIGS. 7 and 8 shows it as having a reduced diameter portion, which is not present in FIG. 6. Such reduced diameter portion is not required.

Components 9, 22, 24, and 27 are moved by a step motor (not shown) installed in the device 14 and controlled by a suitable software program.

The principle of the distribution frame just described facilitates integration of advanced functions such as remote surveillance, coupled demand or line testing in response to a fault report, for example.

Figure 9A:
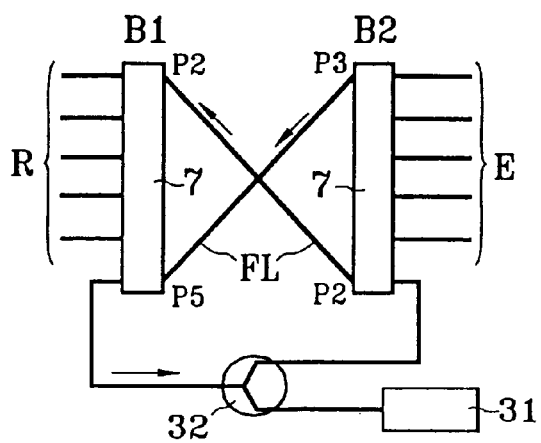
FIGS. 9A and 9B are diagrammatic fragmentary views of the FIG. 1 distribution frame showing its connection to control means, FIG. 9A showing remote surveillance measurements on a jumper fiber in use and FIG. 9B showing a line test in response to a reported fault.

FIG. 9A shows one embodiment of the remote surveillance function. As shown in the figure, ports dedicated to remote surveillance are identified on the connection modules 12. In the example shown, this refers to the port P2 of a module 12 on the first cross-connection panel B1, the port P5 of another module 12 on the first cross-connection panel B1, the port P3 of a module 12 on the second cross-connection panel B2, and the port P2 of another module 12 on the second cross-connection panel B2.

To carry out remote surveillance, two jumper fibers FL are necessary, one connecting the two ports P2 and the other connecting the ports P3 and P5. Said jumper fibers are also connected to test means 31, such as a reflectometer, by a coupler 32.

Figure 9B:
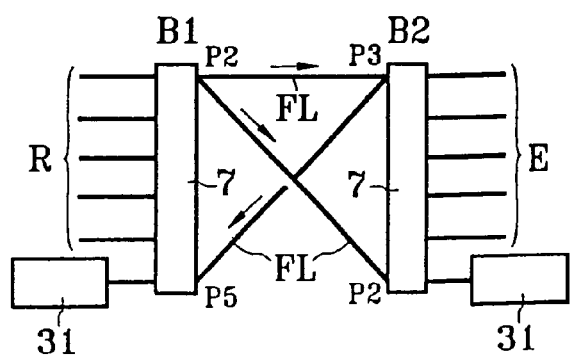

FIG. 9B shows one example of line testing in response to a reported fault either on the network side or on the equipment side.

As shown in the figure, when a fault is reported, for example a fault on the jumper fiber FL connecting the port P2 of a module 12 of a support 7 on the first cross-connection panel B1 to the port P3 of a module 12 of a support 7 on the second cross-connection panel B2, the jumper fiber FL is extracted automatically by the connection and disconnection device 14. A jumper fiber FL, one end of which is connected to test means 31, for example a reflectometer, is then automatically connected by the connection and disconnection device 14. The end of the fiber that is not connected to the reflectometer 31 is either connected to the port P3 on the second cross-connection panel B2 for an equipment side test or to the port P2 on the first cross-connection panel B1 for a network side test.

If a line test must be effected on the equipment side and also on the network side, as is the case in FIG. 9B, a single tester 31 can be used instead of two, for example by providing a switch that can selectively connect it to the measurement connection fibers.

We claim:

1. A distributor comprising:
   a first set of connectors for connecting to a first set of external cables;
   a second set of connectors for connecting to a second set of external cables;
   at least one jumper cable that connects between a connector of the first set of connectors and a connector of the second set of connectors for providing a connection between one of the first set of external cables and one of the second set of external cables; and
   an automated mechanism configured to disconnect a first end of the jumper cable from a first connector of the first set of connectors and to reconnect the first end to a second connector of the first set of connectors.

2. The distributor of claim 1, wherein the mechanism includes a device configured to position the mechanism.

3. The distributor of claim 1, wherein the mechanism is configured to be operable by control software.

4. The distributor of claim 1, wherein the external and jumper cables are optical cables, the connectors are optical connectors, and said providing connections provides optical connections between the first and second subsets of external cables.

5. The distributor of claim 1, wherein the external and jumper cables are optical and electrical cables, the connectors are optical and electrical connectors, and said providing connections provides optical and electrical connections between the first and second subsets of external cables.

6. The distributor of claim 1, wherein the mechanism is further configured to disconnect a second end of the jumper cable from a first connector of the second set of connectors and to reconnect the second end of the jumper cable to a second connector of the second set of connectors.

7. The distributor of claim 1, wherein the mechanism includes an assembly of sub-mechanisms, and wherein each sub-mechanism is configured to perform one or more of the operations of retaining, gripping, pushing, moving, and extracting jumper cables while the mechanism is connecting or disconnecting jumper cables from connectors of the first or the second sets of connectors.

8. The distributor of claim 7, wherein the sub-mechanisms are configured to be operable by control software.

9. The distributor of claim 7, wherein at least one sub-mechanism is positioned to perform operations involving the first set of connectors, and at least one sub-mechanism is positioned to perform operations involving the second set of connectors.

10. The distributor of claim 1, wherein the first set of connectors are positioned to face the second set of connectors, and the jumper cables and the mechanism are positioned between the first set of connectors and the second set of connectors.

11. A distribution frame comprising:
a first cross-connection panel and a second cross-connection panel that face each other; and
a first set of connection modules that are attached to the first cross-connection panel, and a second set of connection modules that are attached to the second cross-connection panel;
wherein each module of the first set is connected to one end of an optical fiber of a first group of fibers, each module of the second set is connected to one end of an optical fiber of a second group of fibers, and an optical fiber of the first group is connected to an optical fiber of the second group by a jumper fiber which has two ends respectively received in a port of one of the modules of the first set and in a port of one of the modules of the second set,
wherein the first panel includes at least one first connection module support to which are mounted one or more of the first set of modules, and the second panel includes at least one first connection module support to which are mounted one or more of the second set of modules,
wherein each of the first and second panels includes at least one second connection module support, and the second connection module support of the first panel and the second connection module support of the second panel cooperate with each other to form a storage area between the first and second panels for jumper fibers that are not in use, and
wherein the jumper fibers not in use are connected in parallel to each other between one of the second connection module supports on the first panel and one of the second connection module supports on the second panel, and
wherein each jumper fiber is positioned directly above the preceding one as and when it is stowed.

12. The distribution frame of claim 11, wherein the second connection module supports face each other.

13. The distribution frame of claim 11, wherein the jumper fibers are all the same length.

14. The distribution frame of claim 11, wherein the first and second cross-connection panels each have first and second opposite sides respectively extending in a first direction and a second direction, and the first and second connection module supports of the first cross-connection panel and the first and second connection module supports of the second cross-connection panel are adapted to rotate about a respective spindle extending in the first direction so that each support is adapted to be swung between a rest position, in which the support extends toward the exterior of the distribution frame at an angle to the first direction, and a working position, in which the support extends in the second direction.

15. The distribution frame of claim 11, wherein each second connection module support is on one side of the associated cross-connection panel.

16. The distribution frame of claim 11, wherein the ends of each jumper fiber extend in a third direction.

17. The distribution frame of claim 11, wherein test means are adapted to test remotely any optical fiber of the first group and/or any optical fiber of the second group continuously or in response to a reported fault.

18. A method comprising:
a) moving a device into a storage area, wherein the device is configured to connect and disconnect jumper fibers;
b) using the device to disconnect a first end of a jumper fiber connected to a second support on a first cross-connection panel in the storage area;
c) using the device to move the first end of the jumper fiber toward a first support on the first cross-connection panel;
d) using the device to connect the first end of the jumper fiber to a port of a module on the first support;
e) moving the device into the storage area;
f) using the device to disconnect a second end of the jumper fiber connected to a second support on a second cross-connection panel in the storage area;
g) using the device to move the second end of the jumper fiber toward the first support on the second cross-connection panel; and
h) using the device to connect the second end of the jumper fiber to a port of a module on the first support on the second cross-connection panel.

19. The method of claim 18, wherein the jumper fiber to be disconnected in the storage area is at the highest level of that area.

20. The method of claim 18, wherein the jumper fiber is connected above a mass of jumper fibers in use.

21. The method of claim 18, wherein steps b) and f) further include:
1) moving the device in a first direction, a second direction and a third direction in the vicinity of a port of a connection module on a support in a working position, to which port a fiber end is connected, in order to position a holding member substantially on an axis of the port,
2) moving the device in the third direction towards the connection module until the fiber end enters a slot of the holding member,
3) moving a retaining member in the first direction to its working position to fasten the fiber end to the retaining member,
4) moving the device in the third direction a small distance away from the connection module, and
5) moving the support into a rest position.

22. The method of claim 18, wherein steps d) and h) further include:
1) moving the device in a first direction, a second direction and a third direction in the vicinity of a port of a connection module on the support in the working position, to which port the fiber end is connected, in order to position the holding member substantially on the axis of the port,
2) moving a retaining member in the first direction to its rest position to separate the fiber end to be connected from the holding member,
3) moving a pusher member in the third direction towards the connection module to extract the fiber end from the holding member,
4) moving the device in the third direction towards the connection module until the fiber end is connected to the connection module, and
5) moving the device in the third direction away from the connection module.

23. The method of claim 18, wherein jumper fibers not in use are connected in parallel to each other between the second support on the first panel and the second support on the second panel, each jumper fiber being arranged directly above the preceding one when it is stored.

24. The method of claim 18, wherein the first cross-connection panel and the second cross-connection panel face each other, and wherein the second supports on the first and second panels cooperate with each other to form the storage area for jumper fibers that are not in use.

25. A method comprising:
  a) moving a device into an area between a first support on a first cross-connection panel and a first support on a second cross-connection panel, wherein the device is configured to connect and disconnect jumper fibers;
  b) using the device to disconnect a second end of a jumper fiber connected to the first support on the second cross-connection panel;
  c) releasing the second jumper fiber end into a mass of jumper fibers in use;
  d) using the device to disconnect a first end of the jumper fiber connected to the first support on the first cross-connection panel;
  e) extracting the jumper fiber from the mass of jumper fibers in use with an extractor device; and
  f) using the device to connect the jumper fiber in a storage area.

26. The method of claim 25, wherein during the step (e) traction is applied to the first end of the jumper fiber.

27. The method of claim 26, wherein traction is applied to a jumper fiber above the first cross-connection panel.

28. The method of claim 25, wherein the jumper fiber extractor device includes a pair of rollers between which the jumper fiber passes and which can be driven in rotation to feed the jumper fiber.

29. The method of claim 28, wherein the rollers are covered with an elastically deformable material to conform to the jumper fiber's shape as it passes between the rollers.

30. The method of claim 25, wherein steps b) and d) further include:
  1) moving the device in a first direction, a second direction and a third direction near a port of a connection module on a support in a working position, to which port a fiber end is connected, in order to position a holding member substantially on an axis of the port,
  2) moving the device in the third direction towards the connection module until the fiber end enters a slot of the holding member,
  3) moving a retaining member in the first direction to its working position to fasten the fiber end to the retaining member,
  4) moving the device in the third direction a small distance away from the connection module, and
  5) moving the support into a rest position.

31. The method of claim 25, wherein step f) further includes:
  1) moving the device in a first direction, a second direction and a third direction near a port of a connection module on a support in a working position, to which port a fiber end is connected, in order to position a holding member substantially on an axis of the port,
  2) moving a retaining member in the first direction to its rest position to separate the fiber end to be connected from the holding member,
  3) moving a pusher member in the third direction towards the connection module to extract the fiber end from the holding member,
  4) moving the device in the third direction towards the connection module until the fiber end is connected to the connection module, and
  5) moving the device in the third direction away from the connection module.

32. The method of claim 25, wherein jumper fibers not in use are connected in parallel to each other between a second support on the first panel and a second support on the second panel, each jumper fiber being arranged directly above the preceding one when it is stowed.

33. The method of claim 25, wherein the second supports on the first and second panels cooperate with each other to form the storage area for jumper fibers that are not in use.

* * * * *